Sept. 24, 1957
L. E. NORTON
2,807,721
GAS CELL FREQUENCY CONTROL
Filed Feb. 20, 1953
3 Sheets-Sheet 1
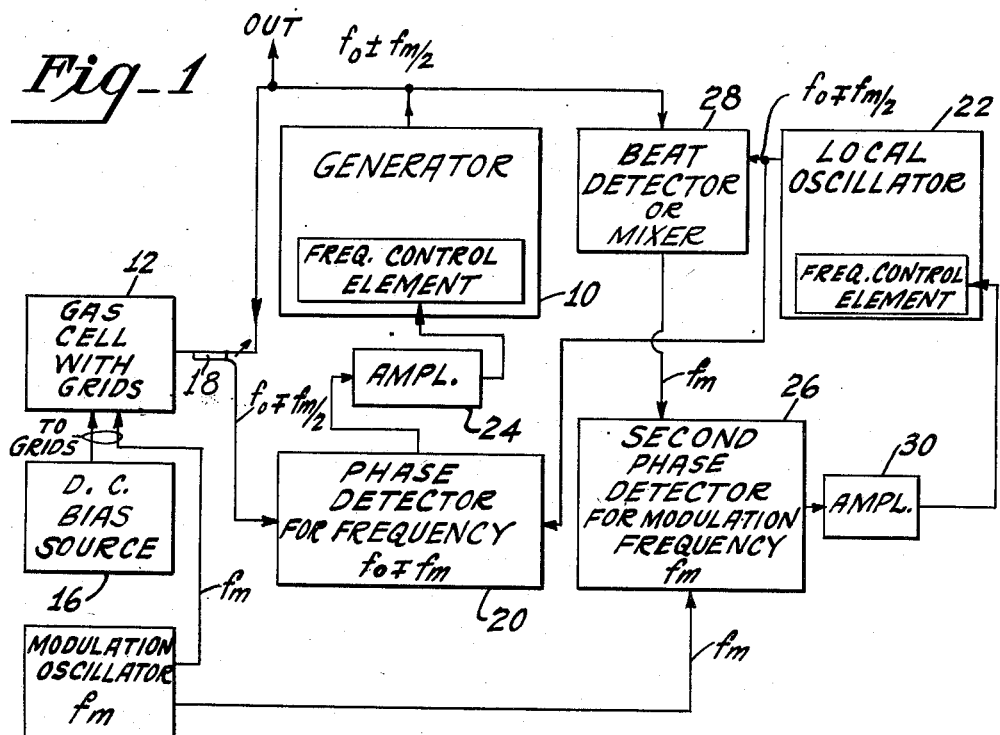
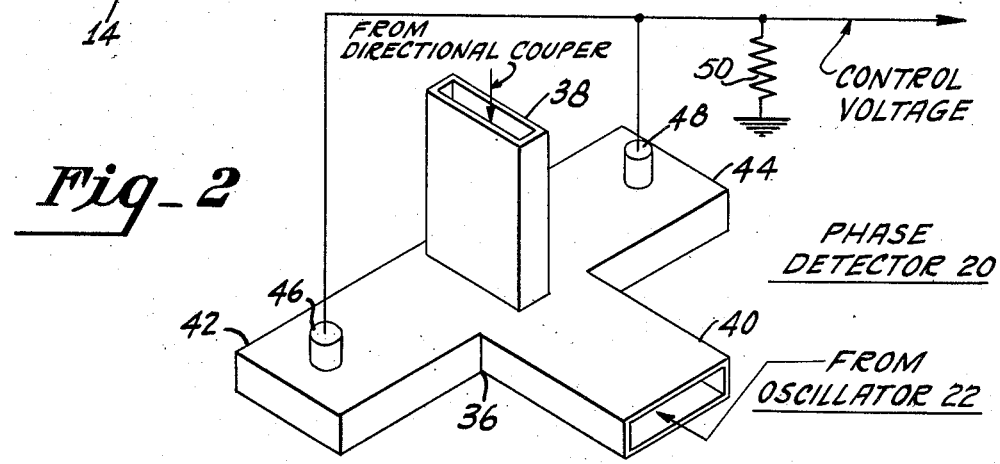
INVENTOR.
LOWELL E. NORTON
BY *Milton S. Winters*
ATTORNEY

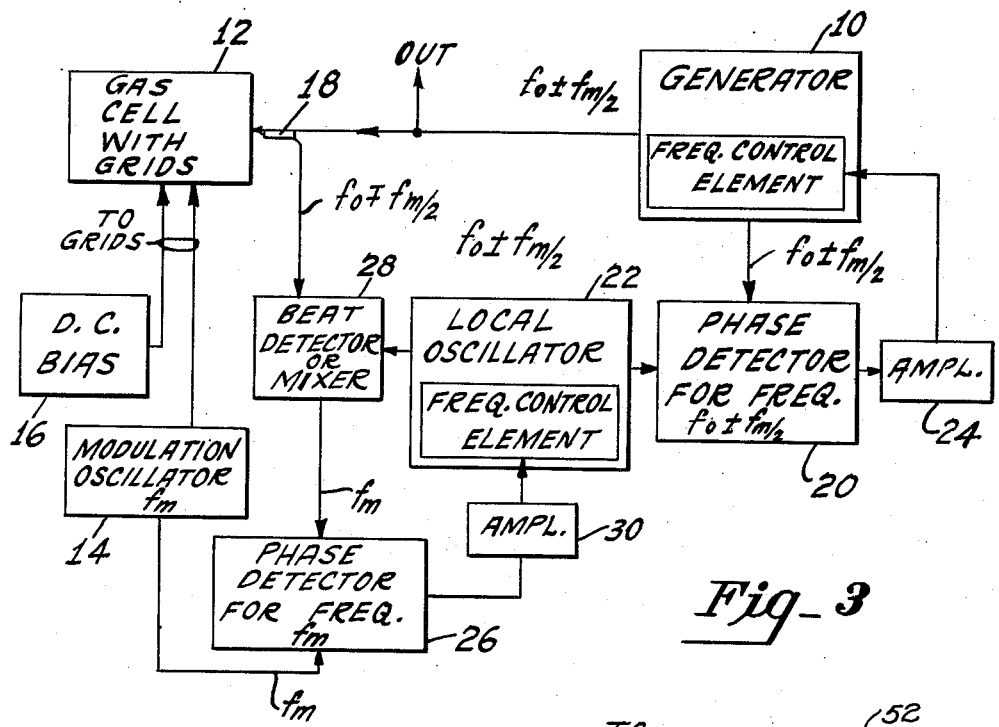
*Fig_3*
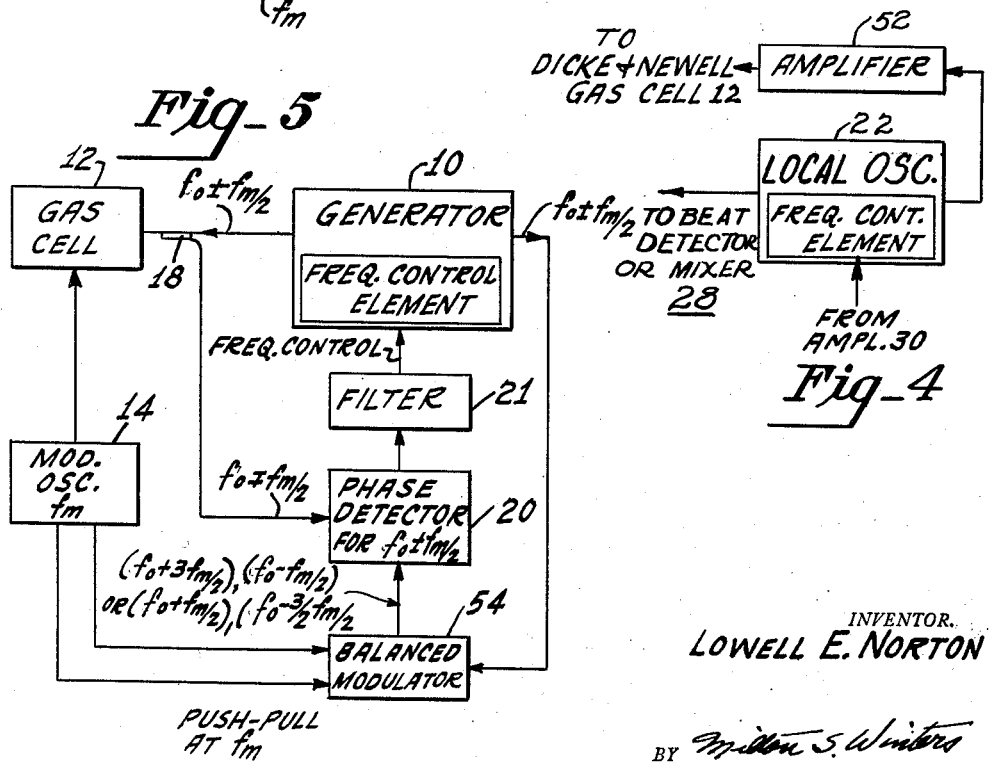
*Fig_5*
*Fig_4*
INVENTOR.
LOWELL E. NORTON
BY Milton S. Winters
ATTORNEY

INVENTOR.
LOWELL E. NORTON

United States Patent Office 2,807,721
Patented Sept. 24, 1957

2,807,721

GAS CELL FREQUENCY CONTROL

Lowell E. Norton, Princeton, N. J., assignor to Radio Corporation of America, a corporation of Delaware Application February 20, 1953, Serial No. 338,062

10 Claims. (Cl. 250—36)

The present invention is related to gas cell microwave frequency control systems, and particularly to such systems which employ a gas cell with means for applying a modulating signal to secure a spatial and time dependent modulating field.

A gas cell with grids at predetermined regular spacings and employed for frequency control is disclosed in the copending application of Robert H. Dicke and George S. Newell, Jr. entitled Molecular Resonance System, Serial No. 243,082, filed August 22, 1951, now Patent No. 2,749,443, issued June 5, 1956. In the operation of this gas cell, incident radiation at a frequency above the normal resonance frequency of the gas molecules in the cell by half the modulating frequency results in coherent reflections or re-radiations from one velocity class of resonant molecules displaying a resonance, or spectral line, at a frequency below the normal gas molecular resonance frequency by half the modulating frequency. Similarly, if the incident microwave radiation is at a frequency below the normal resonance of the gas molecules in the cell by half the modulating frequency, the coherently reflected radiation displays a spectral line at a frequency above the normal gas resonance by half the modulating frequency. Other means for securing the spatial and time dependent modulating field are disclosed in the said Dicke and Newell application. Such a gas cell as that described in the said Dicke and Newell application with means for securing a spatial field, will be termed herein as Dicke-Newell gas cell.

The microwave energy coherently reflected from the gas cell with the spatial modulating field means as pointed out above, displays a spectral line either at a frequency above or a frequency below the normal gas resonance point by half the modulating frequency, depending on whether the incident energy is below or above the normal resonance point. This coherently reflected spectral line is characterized by the usual amplitude variation associated with resonance, and also by the phenomenon of anomalous dispersion which, like ordinary resonance, implies an exaggerated or critical phase shift with frequency in the close neighborhood of the spectral line. Therefore, the spectral line may be used for frequency control or for other purposes.

It is an object of the present invention to provide an improved frequency control system of the type employing a Dicke-Newell gas cell.

A further object of the invention is to improve the accuracy of control of a generator by means of a Dicke-Newell gas cell system.

A further object of the invention is to utilize in an improved manner the field modulation signal in a system using a Dicke-Newell gas cell, and particularly to secure an improved control of the generator frequency.

A further object of the invention is to improve control of the generator particularly when it is desired to employ a local oscillator.

In accordance with the invention, the generator frequency is maintained at the desired frequency by applying energy therefrom to the Dicke-Newell gas cell. The coherently reflected energy contains a component differing in frequency from the incident energy by the modulation frequency. Thus three frequencies of oscillations are available: the generator frequency, the reflected component frequency, and the modulation frequency. Any one of these three beat against the other will give rise to a beat frequency equal to the third. The beat frequency may then be phase detected against the third. Any frequency shift from the proper generator frequency will cause an exaggerated phase shift in the reflected energy. This phase shift causes the phase detector output to vary in sense and amplitude with the generator frequency shift from its proper desired frequency. Therefore the phase detector output may be employed as a frequency control voltage for the generator.

In accordance with another feature of the invention, a local oscillator may be used phase-locked in frequency with the generator. If phase-locked at the same frequency, this is equivalent to using a single generator, except for certain advantages, described hereinafter, especially for the higher microwave frequencies. In another embodiment, a local oscillator may be employed phase-locked at a frequency displaced from the generator frequency by the modulation frequency. This arrangement will be recognized as equivalent to deriving a beat frequency component between the generator and the modulation oscillator, which beat frequency component is then phase detected against the component reflected from the gas cell to give the frequency control voltage to be applied to the generator. However, this embodiment has advantages of its own for operation at the higher microwave frequencies, as mentioned hereinafter.

The invention affords an advantage in dispensing with an intermediate beat frequency using an uncontrolled local oscillator, or one which cannot be so closely controlled in relation to any intermediate frequency. In those cases in the present invention where a local oscillator is employed, its frequency is closely controlled by the beat between two of the following three frequencies: (1) controlled generator frequency, (2) the modulation frequency, and (3) the gas cell molecular reflected or re-radiated frequency. Therefore, the local oscillator frequency, when one is used, is itself maintained automatically at a stable frequency which does not disturb the system control acuracy.

In other forms, however, it is deemed more desirable to secure the beat frequency between two of the three frequencies directly. Closer control and greater accuracy is thus afforded, especially where sufficient power is available at the microwave frequencies.

The foregoing and other objects, advantages, and novel features of the invention will be more readily apparent from the following description, when read in connection with the accompanying drawing, in which similar parts bear similar reference numerals, and in which:

Fig. 1 is a circuit diagram in schematic block form, illustrating a preferred embodiment of the invention as employed in a frequency control system having a local oscillator of a nominal frequency equal to that of the spectral line frequency of the energy reflected from the Dicke-Newell gas cell;

Fig. 2 is a perspective view schematically illustrating a component of the system of Fig. 1;

Fig. 3 is a circuit diagram in schematic block form illustrating another embodiment of the invention, as employed in a frequency control system having a local oscillator of a nominal frequency the same as that of the microwave energy applied to or incident on the Dicke-Newell gas cell;

Fig. 4 is a circuit diagram in schematic block form illustrating a variation of Fig. 3 whereby no local oscillator is required;

Fig. 5 is a circuit diagram in schematic block form illustrating an embodiment of the invention employing a balanced modulator as a mixer to secure one of the desired beat frequency components.

Figure 6:
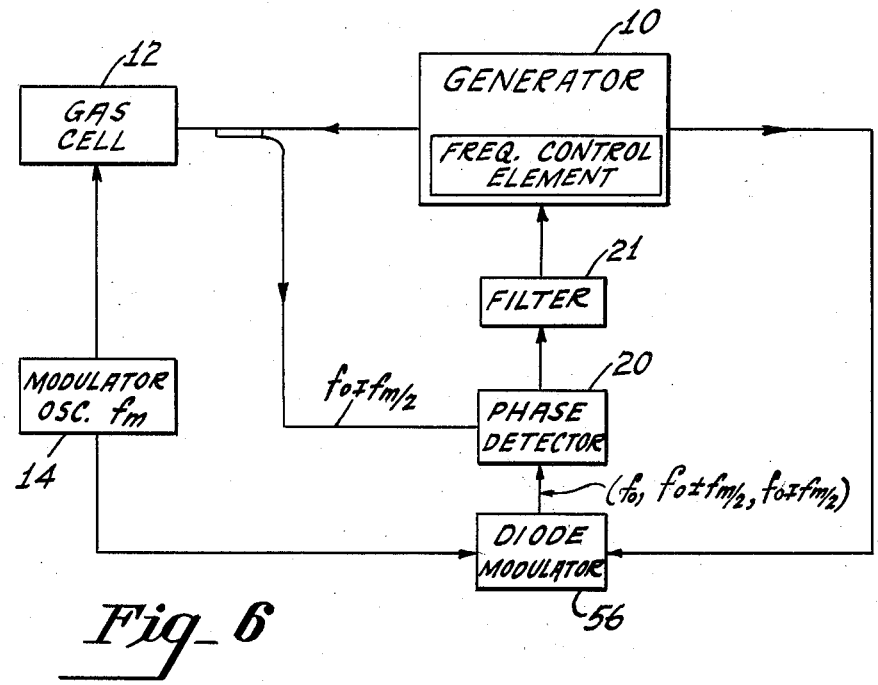
Fig. 6 is a circuit diagram in schematic block form illustrating an embodiment of the invention employing a diode modulator as a mixer to secure one of the desired beat frequency components.

Referring to Fig. 1, a generator 10 to be frequency-stabilized is connected to apply energy at a nominal frequency $f_0 \pm f_m/2$ to a Dicke-Newell gas cell 12. The gas cell 12 may have, as a means for receiving a spatial and time dependent modulating voltage, a plurality of planar parallel grids a quarter wavelength apart in the cell at the normal or undisturbed resonance frequency of the gas in the gas cell 12 along the direction in which incident energy from generator 10 is applied. A modulation oscillator 14 having a frequency of oscillation $f_m$ is connected to gas cell 12 to apply modulation signal to the grids. It may be desirable to apply a D. C. voltage to alternate grids of the gas cell 12 as explained in the said copending application, for which purpose a D. C. bias source 16 is shown.

Energy coherently reflected from the gas cell 12 is coupled by a directional coupler 18 to a phase detector 20. The phase detector also receives energy from a local oscillator 22 having a nominal frequency equal to that of the reflected or reradiated spectral line from the gas cell 12, or $f_0 \mp f_m/2$. It will be understood in accordance with the usual convention when + or − is used, that all upper signs are read together, or all lower signs. The output of phase detector 20 is a voltage responsive in polarity and amplitude to the difference in phase between the energy from the gas cell at the spectral line frequency $f_0 \mp f_m/2$ which contains a critically frequency dependent phase term due to anomalous dispersion in the frequency interval of the reduced bandwith line, and the energy from the local oscillator 22 at the same nominal frequency. This output of phase detector 22 is applied, if desired through an amplifier 24, to the generator 10 as a frequency control voltage.

The local oscillator also is responsive to a frequency control voltage from a phase detector 26 for the modulation frequency $f_m$. This second phase detector 26 receives voltage from the modulation oscillator 14 as a reference voltage and compares the phase thereof with a beat frequency signal derived in a beat detector or mixer 28. The output of the second phase detector 26 is a voltage having sense and amplitude corresponding to the relative phase of two voltages of nominal frequency $f_m$ equal to the modulation frequency. The output of the second phase detector 26 may be amplified in an amplifier 30 before application to the local oscillator 22. The beat detector 28 is coupled to receive energy from the generator 10 output and to receive energy from the local oscillator 22 output and produces the beat $f_m$ between these two last-named outputs. The directional coupler 18 may be a slot or hole coupler in waveguide, and suitable couplers to apply energy from the gas cell 12 toward the phase detector 20 will be known to those skilled in the art.

The first phase detector 20 may take the form shown in Fig. 2. A magic T 36, in waveguide form, has applied to one arm 38 of a pair of arms 38, 40 energy from the directional coupler 18. The other arm 40 of the same pair receives energy from local oscillator 22. The remaining pair of arms, 42 and 44 have respectively matched terminations with crystal detectors 46 and 48 at equal distances from the magic T plane of symmetry. The crystals are connected so that the currents through a suitable load resistor 50 are in opposition. One terminal of the resistor 50 is connected to a common ground connection conventionally indicated. Such common ground is not shown in Fig. 1, which is a conventional block schematic. Such a connection may be assumed where necessary.

If the relative phases of the voltages applied to arms 38 and 40 of Fig. 2 are equal, and assuming a balanced circuit, the net voltage across resistor 50 is zero. If the phase of one applied voltage exceeds that of the other, the voltage across the resistor is one polarity, and reverses if the phase of the other applied voltages exceeds that of the first. At least within a limited range, the voltage is proportional in amplitude to the phase difference.

The second phase detector may be of a lumped constant circuit type suitable to the frequency $f_m$, which may be a few thousand cycles per second.

Referring again to Fig. 1, in operation, the frequency of the generator 10 is controlled by the relative phase between signals coherently reflected from the gas cell 12 and those applied from the local oscillator 22. The normal or undisturbed gas resonance angular frequency is taken as $f_0$. Then the generator 10 frequency is nominally $f_0 \pm f_m/2$. The energy coherently reflected has a spectral line at $f_0 \mp f_m/2$. This reflected energy has an anomalous phase shift characteristic. Accordingly, any departure of the generator frequency from $f_0 \pm f_m/2$ results in a greatly exaggerated phase shift of energy from gas cell 12 at $f_0 \mp f_m/2$. If local oscillator 22 is stable at its nominal frequency $f_0 \mp f_m/2$, the exaggerated phase shift quickly causes a correction voltage applied through amplifier 24 to regenerator 10 to its proper operating frequency of $f_0 \pm f_m/2$.

The stability of the local oscillator 22 is assured by beating its output with that of the generator 10. The phase of the difference frequency between the frequency of generator 10 and local oscillator 22 is maintained by detecting the beat frequency, which is to be kept at $f_m$, and comparing the phase of this beat with the phase of energy of frequency $f_m$ from the modulation oscillator 14 in the second phase detector 26. If the beat departs from its proper phase at frequency $f_m$, the local oscillator is corrected by voltage from the second phase detector 26 amplified in amplifier 30 in a sense and amount to return the local oscillator 22 to its proper frequency difference from generator 10. Thus both generator 10 and local oscillator 22 are maintained at their proper frequencies. It should be apparent that the local oscillator output frequency is thus the equivalent of the beat frequency between the generator 10 and the modulation oscillator 14. This output necessarily tracks at the difference frequency or beat frequency between generator 10 and modulation oscillator 14 outputs. However, by this embodiment one may assure ample power of definite phase at the desired local oscillator frequency and the absence at the phase detector of undesired beat frequency components. A filter (not shown) may be necessary or desirable to exclude the undesired frequency component reflected from the internal metallic structure of the gas cell 12, which has the frequency of the generator 10. Such filters, to exclude an undesired beat frequency particularly from any of the phase detectors, or to exclude the undesired generator frequency component reflected from the gas cell, may be necessary or desirable to avoid spurious responses at the phase detector output, in any of the embodiments. Such filters, however, are not pertinent to the invention claimed and are well known, and therefore are not illustrated.

Referring to Fig. 3, the local oscillator 22 has a nominal frequency of $f_0 \pm f_m/2$, which is the same as the nominal frequency of the generator 10. After the energy from generator 10 is reflected in gas cell 12, the reflected energy at frequency $f_0 \mp f_m/2$ is coupled through directional coupler 18 to the beat detector 28, and beat with energy from local oscillator 22 of nominal frequency $f_0 \pm f_m/2$ to derive a beat signal of frequency $f_m$. The coherently reflected energy contains a critically frequency-dependent phase term due to anomalous dispersion in the frequency interval of the reduced bandwidth line which is preserved in this beat signal. This beat signal is applied to the second phase detector 26 for comparison to a signal of frequency $fm$ coupled to the second phase detector 26 from the modulation oscillator 14 as a reference signal. The resultant voltage is applied, if desired through amplifier 30, as a frequency control voltage to local oscillator 22.

The local oscillator 22 also is coupled to apply its oscillations to the phase detector 20 which likewise receives signal from the generator 10. The phase detector 20 develops a frequency control voltage applied through amplifier 24 to control the frequency of generator 10.

The operation of the system of Fig. 3 will be apparent from what has been said heretofore. The local oscillator 22 is controlled by the voltage from the second phase detector 26 to remain at the proper frequency difference of $fm$ from the reflected energy with which its signal is beat. The generator 10 is controlled by the voltage from phase detector 20 to remain at the frequency of the local oscillator 22. At first glance, it may appear useless to employ a local oscillator of the same frequency as the generator 10. As in the Dicke and Newell application mentioned herein, one can use energy at the oscillator frequency from generator 10 reflected by physical structural discontinuities of the Dicke-Newell gas cell 12, or from a special reflecting termination near the directional coupler 18, as proposed in the said Dicke and Newell application. However, for best phase detection, the reference signal should be comparatively strong, of uniformly progressing phase, and without clutter. The internal reflections from the gas cell 12 due to the grids or other structural discontinuities include much clutter, noise and the like. Therefore, there is a phase non-uniformity since the reflected signal is then of a leakage type. This phase non-uniformity is undesirable in using this reflected signal of nominal frequency $f_0$ as a carrier for the pseudo side-band of the gas reflected energy at nominal frequency $f_0 \mp fm/2$. In short, the Dicke-Newell cell reflects not only the pseudo-side band, but also the carrier energy. By the beat detector, the beat frequency desired may easily be separated with suitable filter means (not shown). The present arrangement affords a strong, direct, definitely phased signal for reference in the beat detector 28. Further, it avoids the necessity for loading the generator 10, and yet provides adequate control for the generator 10. This arrangement is desirable where amplifiers at the frequencies involved provide little gain, that is, at the higher microwave frequencies.

However, if a suitable microwave amplifier is available, the system of Fig. 3 may be modified by omitting the generator 10, phase detector 20 and amplifier 24, and replacing these components with an amplifier 52 such as a klystron or traveling wave tube, as shown in Fig. 4.

The operation of the arrangement of Fig. 3, modified as just suggested is apparent from the foregoing and involves closing the feedback loop around amplifier 52 at frequency $f_0 \pm fm/2$.

Referring to Fig. 5, another simplified system according to the invention is illustrated. In this simplified system, a balanced signal from the modulation oscillator is applied to a balanced modulator 54 to which is also applied signals from the generator 10. The latter signals act as the carrier, which is largely, if not entirely suppressed. The balanced modulator may take the form of known magic T circuits. The output of the balanced modulator contains the frequency components $(f_0+3fm/2)$, $(f_0-fm/2)$ or $(f_0+fm/2)$, $(f_0-3fm/2)$, respectively, depending upon whether the generator 10 excitation frequency is $f_0+fm/2$ or $f_0-fm/2$. The balanced modulator output is fed to phase detector 20. Elimination of the carrier frequency may be advantageous since it is greater in amplitude than the sidebands, serves no useful purpose, and causes the phase detector 20 to operate under somewhat unfavorable signal to noise conditions. The other input of the phase detector 20 is from energy reflected from the gas cell and containing the highly phase-sensitive-with-frequency pseudo-modulation spectral line at frequency $f_0 \mp fm/2$. If generator 10 excitation frequency is $f_0+fm/2$ then the balanced modulator 54 term at frequency $f_0-fm/2$ is used by phase detector 20 while the output term at frequency $f_0+3fm/2$ serves no useful purpose; if generator 10 excitation frequency is $f_0-fm/2$, the balanced modulator term at frequency $f_0+fm/2$ is used by the phase detector 20 while the term at frequency $f_0-3fm/2$ serves no useful purpose. Extraneous frequencies are filtered out, and the phase difference appears at the phase detector output as a voltage having sense and amplitude corresponding to the difference in phase between the frequency components nominally at $f_0 \mp fm/2$. This phase detector output voltage is applied as a frequency control voltage applied to the frequency control element of generator 10.

In operation, when the generator 10 frequency departs from the desired value of $f_0 \pm fm/2$, the exaggerated phase shift in the energy coherently reflected from the gas cell 12 causes a correction voltage to appear at the phase detector 20 output. The generator 10 frequency is caused by this correction voltage to return to its proper value. The balanced modulator 54 here acts as a mixer. By this means, not only is the beat component of frequency $f_0 \pm fm/2$ for phase detection against a like frequency component, derived, but also the carrier is simultaneously suppressed, making filtering easier. If desired, a filter 21 may readily exclude the undesired components from the phase detector if this is deemed desirable.

Referring to Fig. 6, a system similar to that of Fig. 5 is illustrated in which a modulator 56 of the crystal diode type may be employed instead of the balanced modulator of Fig. 5. This system operates in a manner similar to the operation of Fig. 5, except that a strong carrier, which serves no useful purpose, is always supplied to phase detector 20 and causes it to operate under somewhat unfavorable signal to noise conditions. However, it is somewhat simpler.

It will be apparent that there is disclosed herein a frequency control system employing a gas cell of the type having spatial and time dependent modulation means. A modulation oscillator supplies modulation energy to the gas cell means at one frequency. A generator having a nominal frequency displaced in one sense from the normal gas resonance by half the modulation frequency applied incident energy to the gas cell, some of which is coherently reflected to produce a reduced bandwidth spectral line which has a critically frequency dependent phase due to anomalous dispersion in the frequency interval defined by the line. This coherently reflected energy is displaced in an opposite sense from the normal resonance of the gas of the cell by half the modulation oscillator frequency. The frequency difference between this reflected energy and the generator energy is maintained at the proper value by a frequency control circuit which employs means to secure a beat frequency between any two of the energies of nominal frequency $f_0 \pm f/m/2$ (the generator frequency); $f_0 \mp fm/2$ (the reflected energy); and $fm$ (the modulation oscillator energy). The beat frequency is then phase detected against the remaining energy component of the three. It is clear that the highly phase-sensitive-with-frequency component causes the resultant phase detector output to provide a highly sensitive frequency control voltage, in a simplified manner.

What is claimed is:

1. A frequency control system comprising a gas cell having spatial and time dependent modulation means, a modulation oscillator connected to apply modulation oscillations to said means, a generator connected to apply energy to said gas cell and having a frequency control element, whereby energy is reflected from said gas cell, means to derive beat frequency energy at the beat between two of (1) said modulation oscillation energy (2) said reflected energy and (3) said generator energy, a phase detector connected to compare the derived beat energy with the remaining one of said three energies and to derive a voltage having a sense and amplitude dependent on the phase comparison and means connecting said detector to apply said phase comparison dependent voltage to said frequency control element.

2. A frequency control system comprising a gas cell having spatial and time dependent modulation means and the gas of which has a normal resonance at a frequency $f_0$, a modulation oscillator connected to apply modulation oscillations of a frequency $fm$ to said means, a generator having a frequency control element and having a nominal frequency of oscillations of $f_0 \pm fm/2$ connected to apply output energy incident on said gas cell whereby the gas cell reflects energy at a nominal frequency of oscillations of $f_0 \mp fm/2$, means connected to derive a beat frequency voltage between two of said three oscillations, and a phase detector connected to compare the phase between the derived beat frequency voltage and the remaining one oscillations of said three, said generator frequency control element being connected to receive the output of said phase detector.

3. The system claimed in claim 2, the said means to derive beat frequency energy being connected to derive said beat frequency voltage between oscillations of frequency $f_0 \pm fm/2$ and $f_0 \mp fm/2$, said phase detector being therefore connected to compare the phase between the derived beat voltage and the modulation oscillations, both the latter of frequency $fm$.

4. The system claimed in claim 2, the said means to derive beat frequency energy being connected to derive said beat frequency voltage between oscillations of frequency $f_0 \pm fm/2$ and said oscillations of frequency $fm$, said phase detector therefore being connected to compare the phase between the derived beat voltage and said oscillations of frequency $f_0 \mp fm/2$.

5. A frequency control system comprising a gas cell having means for spatial and time dependent modulation, a modulation oscillator connected to apply voltage at a modulation frequency to said means, a generator having a frequency control means and having a nominal frequency displaced from the normal resonance frequency of the gas of said cell by half the modulation frequency and connected to apply energy of said nominal frequency to said cell incident on the gas of said cell, a local oscillator having a frequency control means and having a nominal frequency displaced from said gas resonance frequency by half said modulation frequency and from said generator nominal frequency by said modulation frequency, a phase detector connected to receive the energy coherently reflected by said gas due to incidence of said generator energy and connected to receive energy from said local oscillator and having an output responsive in sense and amplitude to the difference in frequency between the received energies, said phase detector being connected to apply said phase detector output to said frequency control means of said generator, a mixer connected to receive energy from said generator and from said local oscillator and having an output of the beat frequency between the energies received by it, a second phase detector connected to receive said mixer output and to receive energy from said modulation oscillator and having an output responsive in sense and amplitude to the difference in frequency between said mixer output and said modulation oscillator frequency, said second phase detector being connected to apply said phase detector output to said local oscillator frequency control means.

6. A frequency control system comprising a gas cell having a spatial and time dependent modulation means, a modulation oscillator connected to apply modulation voltage to said gas cell means, a generator having a nominal frequency displaced in a first sense from the normal resonance frequency of the gas of said cell by half the modulation oscillator frequency whereby energy coherently reflected from said cell includes energy displaced in frequency in a second sense from said normal resonance by half said modulation frequency, said generator having a frequency control element, a local oscillator having a nominal frequency displaced from said gas resonance frequency by half the modulation frequency and having a frequency control element, a mixer connected to receive energy from said local oscillator and one of said displaced energies to derive a beat frequency signal of modulation frequency, and a modulation frequency phase detector connected to receive said beat frequency signal and energy from said modulation oscillator, said phase detector being connected to apply its output to said local oscillator frequency control element.

7. A frequency control system comprising a gas cell having spatial and time dependent modulation means, and the gas of which has a normal resonance at a frequency $f_0$, a modulation oscillator, a generator to generate modulation oscillations having a nominal frequency of oscillations of $f_0 \pm fm/2$, an amplifier connected to receive and amplify said oscillations and to apply the amplified oscillations as incident radiation on said gas cell whereby said gas cell reflects energy coherently at a nominal frequency of oscillations of $f_0 \mp fm/2$, means connected to derive a beat frequency voltage between two of said three oscillations, and a phase detector connected to compare the phase between the derived beat frequency voltage and the remaining one of the oscillations of said three, said generator frequency control element being connected to receive the output of said phase detector.

8. The system claimed in claim 7, the said means to derive a beat frequency voltage being connected to derive said beat frequency voltage between said oscillations of frequency $f_0 \pm fm/2$ and said oscillations of frequency $f_0 \mp fm/2$, said phase detector therefore being connected to compare the phase between the derived beat voltage and said oscillations of frequency $fm$.

9. A frequency control system as claimed in claim 1, said means to derive a beat frequency including a balanced modulator connected to receive a balanced modulating signal of frequency $fm$ from said modulation oscillator, said balanced modulator being connected to receive oscillations of frequency $f_0 \pm fm/2$ from said generator as a carrier frequency, the said modulator output having a component of frequency $f_0 \mp fm/2$ for application to said phase detector for comparison with said reflected energy.

10. The system claimed in claim 1, said means to derive beat frequency energy comprising a diode modulator.

References Cited in the file of this patent

UNITED STATES PATENTS

| 1,822,812 | Hyland | Sept. 8, 1931 |
| 1,873,842 | Hyland | Aug. 23, 1932 |